Figure 1:
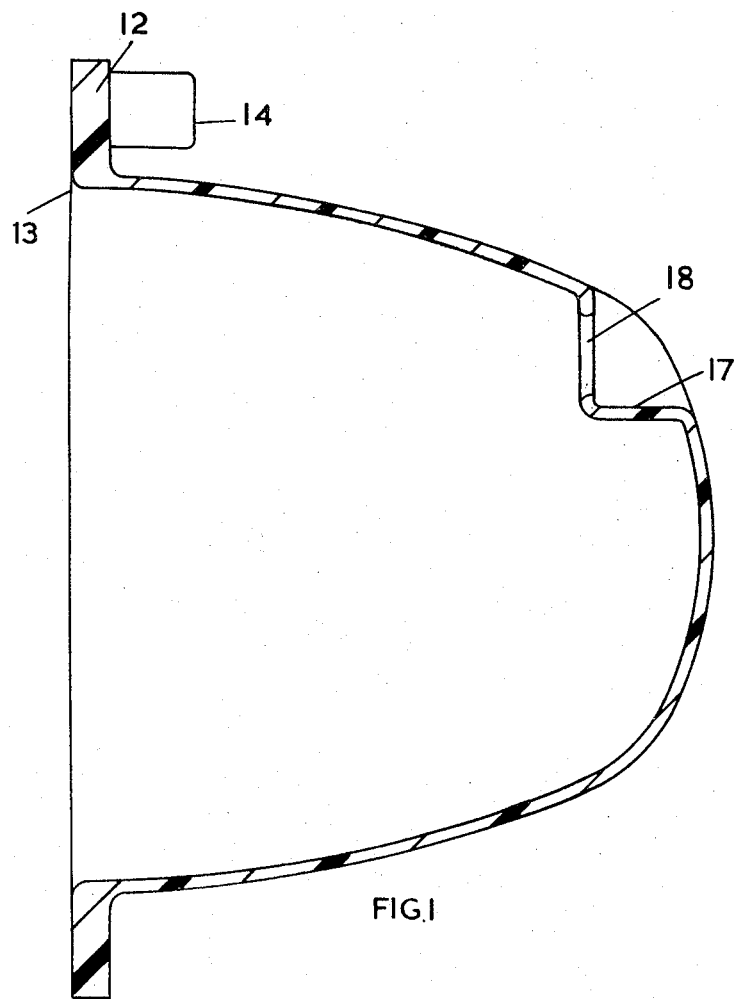

United States Patent [19]
Goodyer et al.

[11] 3,852,586
[45] Dec. 3, 1974

[54] HOUSING FOR A ROAD VEHICLE LAMP

[75] Inventors: Samuel Michael Goodyer, Sutton Coldfield; John Leslie Mulhall, Solihull, both of England

[73] Assignee: The Lucas Electrical Company Limited, Birmingham, England

[22] Filed: May 17, 1973

[21] Appl. No.: 361,246

[30] Foreign Application Priority Data
May 20, 1972 Great Britain.................... 23834/72
Nov. 7, 1972 Great Britain.................... 51267/72

[52] U.S. Cl................................. 240/57, 240/7.1 R
[51] Int. Cl.................................................. B60g 1/00
[58] Field of Search........... 240/57, 7.1 R, 44, 44.2, 240/52 R, 8.1 R

[56] References Cited
UNITED STATES PATENTS
2,920,188  1/1960  Clayton et al. ...................... 240/57
3,225,189  12/1965  Pendell ........................... 240/7.1 R
3,693,000  9/1972  Picard............................... 240/44 X Primary Examiner—Richard L. Moses
Attorney, Agent, or Firm—Hill, Gross, Simpson, Van Santen, Steadman, Chiara & Simpson

[57] ABSTRACT

A housing for a road vehicle lamp comprises a dished body and a flange formed integrally with the dished body. The body and flange are formed from a moulded foamed plastics material, for example foamed polypropylene. The flange if formed so that it is thicker than the dished body and preferably has a density of between 0.5 and 0.8 gm./c.c. whilst the body is formed so that it is substantially non-foamed. The flange is provided with integral sockets to enable the housing to be mounted on a road vehicle and also has forwardly extending displaced portions serving to mount a vehicle lamp in a manner to permit adjustment of the lamp relative to the housing.

7 Claims, 6 Drawing Figures

HOUSING FOR A ROAD VEHICLE LAMP

This invention relates to a housing for a road vehicle lamp, the housing being of the kind including a flange adapted to be secured, in use, to the bodywork of the road vehicle so as to mount the housing on the vehicle whereby, in use, the vehicle lamp is received in the housing so that the housing provides protection for the rear of the lamp against ingress of foreign material.

A housing of the kind specified is known wherein the flange is moulded in a snythetic resin material. However, a problem exists with this known construction in that it is difficult to produce the flange with sufficient thickness and strength to enable the flange to rigidly support the housing in position on a road vehicle under the conditions of vibrational stress which are experienced in use. Accordingly, it has been necessary with this known housing to use an annular, metal mounting plate, as well as the flange, to secure the housing in position on a road vehicle. It has now been found to be possible to produce a synthetic resin flange of sufficient thickness and strength to enable the housing to be rigidly secured to a road vehicle, without the provision of a mounting plate, by moulding the flange in a foamed synthetic resin material, it being appreciated that the synthetic resin material used in the flange of the known construction is non-foamed.

Accordingly, the invention resides in a housing of the kind specified wherein the flange is formed from a foamed, moulded synthetic resin material.

Preferably, the interior of the flange has an average density of between 0.5 and 0.8 gm./c.c.

Preferably, the remainder of the housing is moulded integrally with said flange but is arranged to be substantially non-foamed.

Preferably, the synthetic resin material is polypropylene.

Advantageously, the flange is provided with integral sockets therein adapted to engage screw bolts for adjustably mounting the lamp unit in the housing and also with a hollow integral portion extending forwardly of the remainder of the flange.

Preferably, each integral socket is extended rearwardly of the flange in an integral sleeve portion. Each integral socket may be provided with internal longitudinally extending ribs therein for engaging the screw-threads on a screw bolt when inserted.

The provision of the displaced part permits a smaller bush to be employed than would otherwise be necessary with a conventional metal housing. The displaced part furthermore provides a means for setting the desired spacing between the lamp and the housing, in use.

Figure 2:
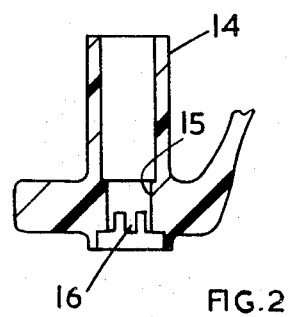
Figure 3:
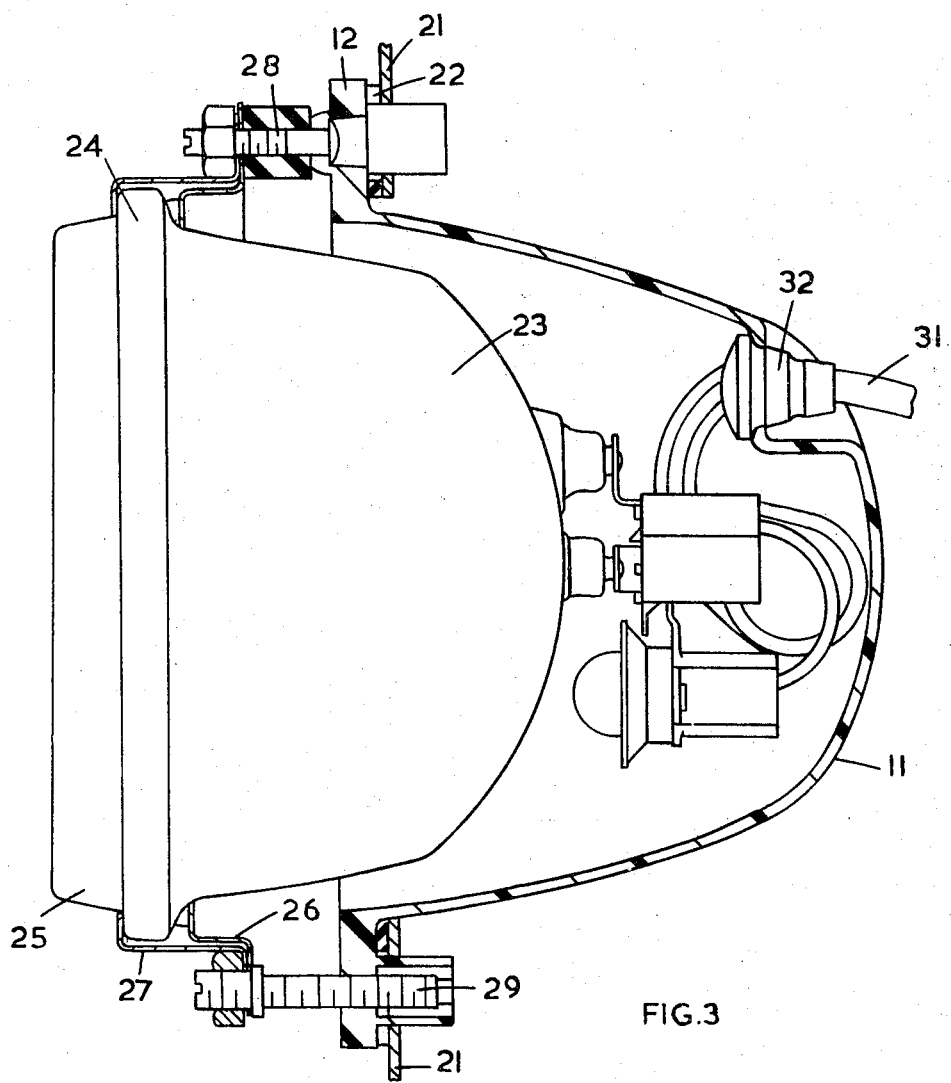
Figure 4:
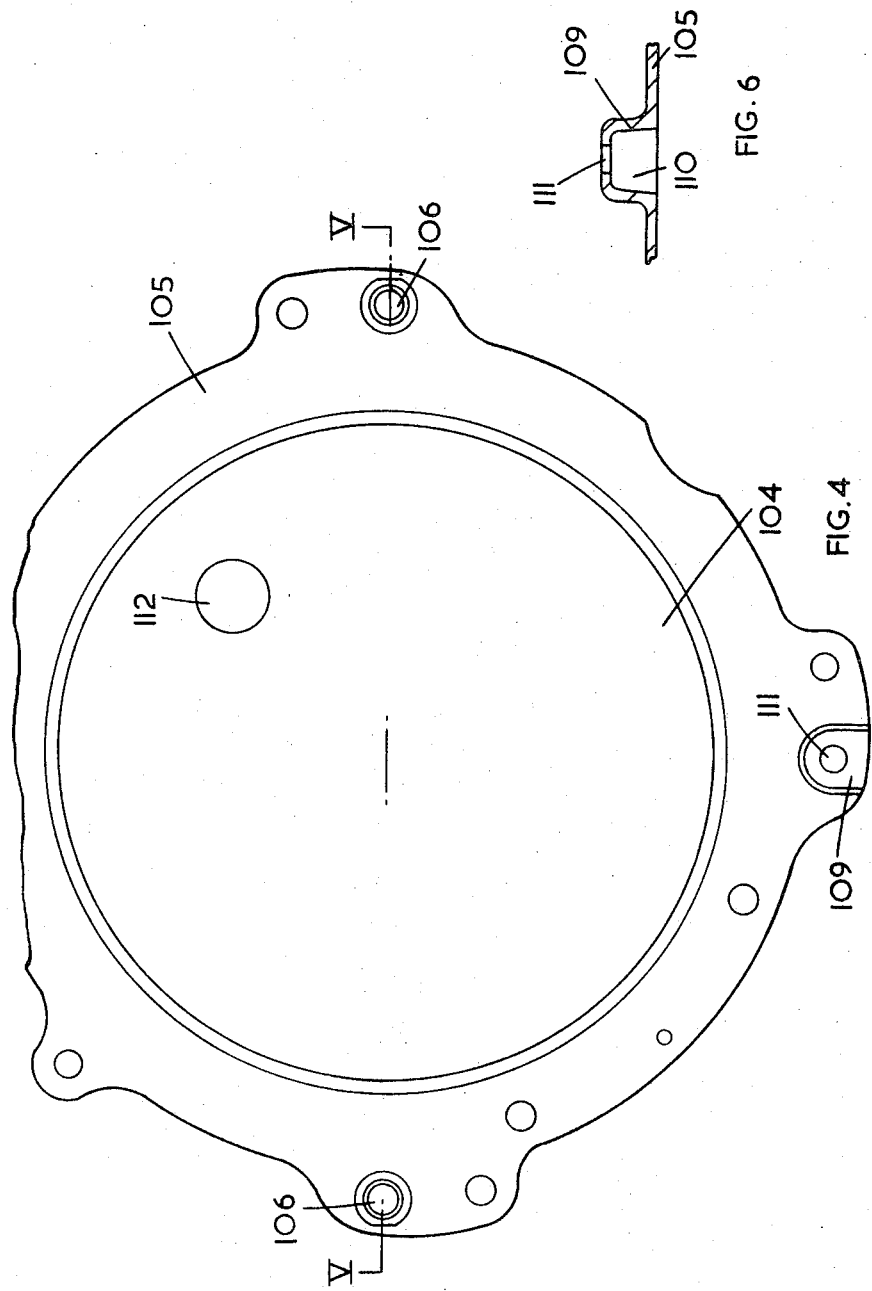
Figure 5:
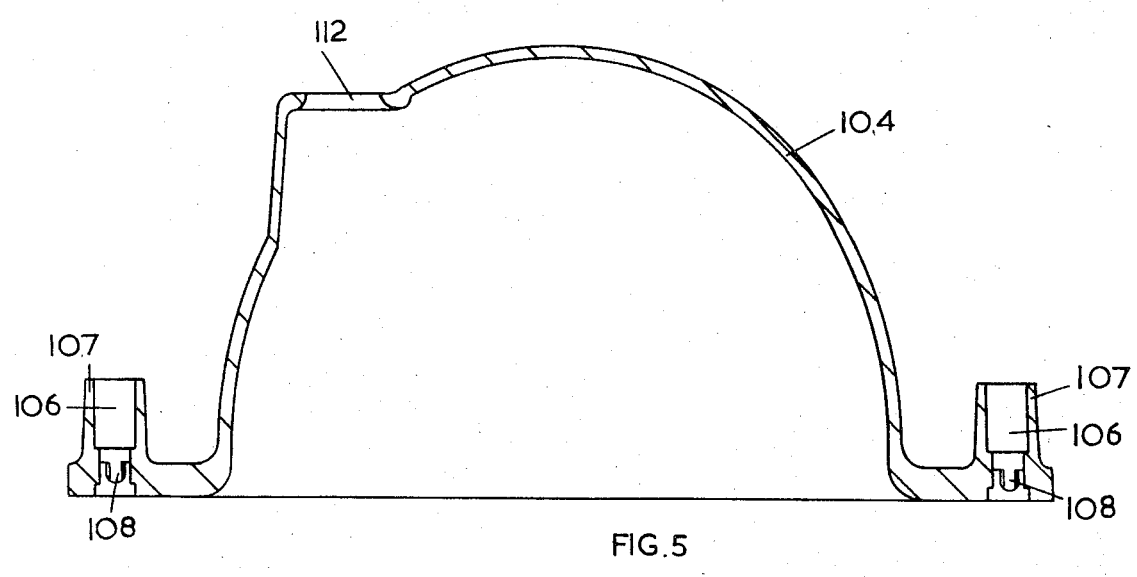

In the accompanying drawings, which illustrate two examples of the invention,

FIG. 1 is a sectional view of a housing of the kind specified according to the present invention, FIG. 2 is a further sectional view of part of the housing of FIG. 1, FIG. 3 is a sectional view of the housing when secured to the bodywork of a road vehicle and receiving a vehicle lamp, FIG. 4 is a plan view of another form of housing of the kind specified, also, according to the present invention, FIG. 5 is a section on the line II—II of FIG. 4, and FIG. 6 is a section on the line III—III of FIG. 4.

Referring to FIGS. 1 to 3 of the drawings, the housing includes a dished body 11 having an integral, annular flange 12 of thickened section extending outwardly from the open end 13 thereof. Projecting from the surface of the flange 12 remote from the open end of the body 11 are a plurality of integral, cylindrical sleeves 14 angularly spaced from one another around the flange. The bore in each sleeve 14 communicates with a hole 15 in the flange 12 and the wall of each hole 15 is provided with an upstanding portion 16 projecting into the hole so that, in use, a screw can be received in the hole 15 and bore 14 with the thread of the screw biting into the upstanding portion 16 to retain the screw in position. Further, the body 11 remote from the open end 13 is formed with a recess 17 and the base of the recess is provided with an aperture 18 so that the recess communicates with the interior of the body 11.

The housing is formed as an injection moulding, conveniently in polypropylene as sold by I.C.I. Limited as type GX543 M, and it is required that the polypropylene of the flange 12 is foamed. Thus, an organic blowing agent, conveniently that sold by Fisons Limited as EPA, is mixed with the polypropylene prior to the moulding operation, the amount of blowing agent in the mixture being between 0.2 and 0.6 percent, or more preferably 0.3 percent, by weight of the polypropylene. Moulding is carried out by injecting the molten mixture into a suitably shaped die cavity and into the region of the die cavity which is to define the base of the body 11, the molten material then flowing into the portions of the die cavity defining the flange 12 and the remainder of the housing. The moulding conditions are arranged so that foaming occurs within the region of the die cavity defining the thickened flange 12, while the synthetic resin material in the remainder of the die remains substantially non-foamed.

In one practical embodiment, it was required to produce a housing in which the body has a depth of 4.5 inches and a thickness of 0.090 inch and in which the flange was substantially rectangular with external dimensions of 6.5 inches by 8 inches and internal dimensions of 5.5 inches by 7 inches. The thickness of the flange was 0.250 inch and the required moulding was produced by injecting the polypropylene/blowing agent mixture into the die at a temperature of 220°C from a screw-type injection moulding machine. The injection pressure was in region of 2000 p.s.i. and the speed of injection was 20 inches/second, at which speed filling of the die was achieved in 0.5 seconds. Cooling of the die was then arranged so that solidification of the synthetic resin material occurred after a period of about 60 seconds, during which time the required amount of foaming in the flange 12 took place. The resultant housing, apart from the flange 12, had a density of about 1.0 gm/c.c., whereas the foaming in the flange 12 lowered the average density of the interior of the flange to about 0.65 gm/c.c. It is, however, to be appreciated that the flange necessarily had an external skin approximately 1/32 inch thick which was substantially unfoamed.

By arranging that the synthetic resin material of the flange 12 is foamed, it is found that the thickness of the flange can be increased as compared with the thickness of the remainder of the housing, without the strength of the flange being adversely affected by factors such as uneven filling of the region of the die defining the flange during moulding, which factors tend to occur if conventional moulding techniques are used to produce the housing. Thus, as shown in FIG. 3, to mount the housing described above on a road vehicle, the flange 12 is bolted to the bodywork 21 of the vehicle without the provision of a separate, metal mounting plate. It will, however, be seen that a rubber sealing ring 22 is interposed between the flange 12 and the bodywork 21, but it is to be appreciated that the ring 22 is provided to prevent ingress of foreign material between the flange and the body work and not help support the housing in position on the vehicle. Also, it is to be appreciated that, in some cases, the gasket may be replaced by an integral annular rib (not shown) on the flange 12. When secured to the bodywork 21, the housing is of course intended to support a lamp unit 23 of the vehicle, the lamp unit 23 shown in the drawings being a sealed beam unit. To support the lamp in position, a projecting portion 24 of the lens 25 of the lamp is trapped between an inner and an outer metal rim 26, 27 respectively, and the rims 26, 27 are secured to the flange 12 of the housing by means of a rivet 28 and screws 29. The screws 29 are received within the holes 15 respectively and the associated sleeves 14 so that the threads of the screws 29 bite into the upstanding portions 16 of the respective holes 15. The screws 29 can therefore be moved axially relative to the flange 12 and therefore provide means for adjusting the orientation of the lamp 22 relative to the housing, whereby the direction of the beam of light which, in use, will be emitted through the lens 25 can be varied.

When the lamp unit 23 is secured to the housing, the electrical leads 31 connected to the external terminals of the lamp extend into the housing through a rubber grommet 32 received in the aperture 18 in the body 11 of the housing. Thus, the body 11 provides a protective cover over the external terminals so as to prevent dirt and other foreign material being deposited on the terminals and thereby inhibiting operation of the lamp.

It is to be appreciated that in some cases the body 11, as well as the flange 12, could be formed of a foamed, synthetic resin material. Also, other synthetic resins than polypropylene could be used to form the flange, such as for example AB.S. resins.

Referring now to FIGS. 4 to 6 of the drawings, the housing is moulded from a foamed, polypropylene copolymer in a similar manner to that of FIGS. 1 to 3 and comprises a dished portion 104 with an integral flange 105. The integral flange 105 has a pair of sockets 106 therein which extend rearwardly of the flange 105 in sleeves 107 which are integral with the flange 105. Each socket 106 is provided with a plurality of longitudinally extending ribs 108 therein. The flange 105 is furthermore provided with a part 109 which is displaced forwardly of the remainder of the flange i.e. in a direction away from the dished portion 104, so as to define a recess 110 in the rear of the flange 105. The displaced portion 109 is provided with an aperture 111 therethrough.

The dished portion 104 has an aperture 112 therein.

In use, the housing is fixed to a motor vehicle by means of bolts (not shown) in a similar manner to the housing of FIGS. 1 to 3, and a headlamp unit (also not shown) is engaged with the dished portion 104 so that the rear of the unit is received therein in a similar manner to the housing of FIGS. 1 to 3. The lamp unit is adjustably located in position by means of a pin fixed to the lamp unit and passing through the aperture 111 in the displaced part 109 with a rubber bush (not shown) disposed between the displaced part 109 and the lamp unit. Thus, the rubber bush is located on the opposite side of the part 109 to the recess 110. Screw bolts (not shown) are engaged in the sockets 106. The action of screwing the bolts into the sockets 106 causes threads to be cut on the integral ribs 108. Adjustment of the screw bolts relative to the respective sockets 106 causes pivoting of the lamp unit relative to the body in the region of the bush in known manner.

In order to provide for an adequate range of adjustment, it has normally been a practice to provide an enlarged rubber bush which extends forwardly of the flange of the housing to provide an abutment for part of the reflector unit. In the present embodiment, however, the displaced part 109 of the flange 105 permits the thickness of the rubber bush to be substantially reduced.

The present invention also contemplates the use of an integral portion on the flange 105 which extends forwardly of the flange 105 and is itself flexible so as to define a flexible bush which is integral with the remainder of the lamp body.

The aperture 112 in the dished portion 104 serves to allow supply leads to pass to a filament assembly of the headlamp.

We claim:

1. A housing for a road vehicle lamp, said housing comprising a body having a flange projecting therefrom, said flange being adapted to be secured, in use, to the bodywork of the road vehicle so as to mount the housing on the vehicle, wherein said flange is formed from a foamed, moulded synthetic resin material.

2. A housing as claimed in claim 1, wherein the interior of the flange has an average density of between 0.5 and 0.8 gm./c.c.

3. A housing as claimed in claim 1, wherein the remainder of the housing is moulded integrally with said flange but is arranged to be substantially non-foamed.

4. A housing as claimed in claim 1, wherein the synthetic resin material is polypropylene.

5. A housing as claimed in claim 1, wherein the flange is provided with integral sockets therein adapted to engage screw bolts for adjustably mounting the lamp in the housing and also with a hollow integral portion extending forwardly of the remainder of the flange.

6. A housing as claimed in claim 5, wherein each socket is extended rearwardly of the flange in an integral sleeve portion.

7. A housing as claimed in claim 5, wherein each integral socket is provided with internal, longitudinally extending ribs therein for engaging the screw threads on a screw bolt when inserted.

* * * * *